(12) United States Patent
Bridges

(10) Patent No.: US 10,819,854 B2
(45) Date of Patent: Oct. 27, 2020

(54) SELECTING BRIDGE TELEPHONE NUMBER FOR DIAL-OUT

(71) Applicant: Microsoft Technology Licensing, LLC, Redmond, WA (US)

(72) Inventor: Gareth Lyndon Eadred Bridges, Duvall, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 69 days.

(21) Appl. No.: 16/271,643

(22) Filed: Feb. 8, 2019

(65) Prior Publication Data
US 2020/0259958 A1  Aug. 13, 2020

(51) Int. Cl.
*H04M 3/42* (2006.01)
*H04M 3/56* (2006.01)

(52) U.S. Cl.
CPC .... *H04M 3/563* (2013.01); *H04M 2203/5063* (2013.01)

(58) Field of Classification Search
CPC ................. H04M 3/563; H04M 2203/5063
USPC ............................. 379/202.01, 158
See application file for complete search history.

(56) References Cited

U.S. PATENT DOCUMENTS

| | | | |
|---|---|---|---|
| 6,741,691 B1 | 5/2004 | Ritter et al. | |
| 7,894,806 B2 * | 2/2011 | Leigh ................. | H04M 3/56 348/14.08 |
| 8,238,536 B1 | 8/2012 | Kavulak et al. | |
| 8,693,660 B2 | 4/2014 | Bhow | |
| 8,855,285 B1 | 10/2014 | Bracken et al. | |
| 9,026,489 B2 * | 5/2015 | Bank ................. | G06F 16/23 707/609 |
| 9,673,989 B2 | 6/2017 | Bhow | |
| 9,762,632 B2 * | 9/2017 | Arora ................. | H04L 65/403 |
| 2003/0174819 A1 * | 9/2003 | Su ................. | H04L 29/06 379/90.01 |

(Continued)

FOREIGN PATENT DOCUMENTS

WO   2018151968 A1   8/2018

OTHER PUBLICATIONS

"Find a Local Number to Join a Skype for Business Meeting", Retrieved from: <<https://support.office.com/en-us/article/find-a-local-number-to-join-a-skype-for-business-meeting-cf69e9ac-d836-42ca-9e4e-c17999b6d9bd>>, Retrieved on Jan. 25, 2019, 3 Pages.

(Continued)

*Primary Examiner* — William J Deane, Jr.
(74) *Attorney, Agent, or Firm* — Alleman Hall Creasman & Tuttle LLP

(57) ABSTRACT

A conference system is provided that includes a processor configured to provision a plurality of bridge telephone numbers having a plurality of different country codes, and receive a dial-out request for one of a plurality of attendees of a conference meeting for connecting to the conference meeting. The dial-out request includes a target telephone number associated with a communication device of the one of the plurality of attendees. The processor is further configured to select one of the provisioned plurality of bridge telephone numbers based on a result of a match between at least a country code of the selected bridge telephone number and the target telephone number, and cause dial-out to the target telephone number from the selected bridge telephone number.

20 Claims, 10 Drawing Sheets

(56) References Cited

U.S. PATENT DOCUMENTS

| | | | | |
|---|---|---|---|---|
| 2005/0031095 | A1* | 2/2005 | Pietrowicz | H04M 3/465 |
| | | | | 379/88.18 |
| 2007/0021990 | A1* | 1/2007 | Lee | G06Q 10/02 |
| | | | | 705/5 |
| 2007/0197224 | A1* | 8/2007 | Winkler | H04W 76/10 |
| | | | | 455/445 |
| 2009/0214019 | A1* | 8/2009 | Brooks | H04M 3/465 |
| | | | | 379/243 |
| 2010/0275134 | A1* | 10/2010 | Baker | H04N 7/147 |
| | | | | 715/753 |
| 2011/0034167 | A1* | 2/2011 | Ben-Shaul | H04M 15/8038 |
| | | | | 455/432.1 |
| 2012/0039456 | A1* | 2/2012 | Conner | H04L 65/1053 |
| | | | | 379/201.11 |
| 2012/0321060 | A1* | 12/2012 | Lucey | H04L 12/1818 |
| | | | | 379/93.21 |
| 2013/0051543 | A1* | 2/2013 | McDysan | H04M 3/568 |
| | | | | 379/202.01 |
| 2013/0058472 | A1* | 3/2013 | de Jong | H04M 3/565 |
| | | | | 379/202.01 |
| 2013/0294260 | A1* | 11/2013 | Do | H04M 7/006 |
| | | | | 370/250 |
| 2013/0331075 | A1 | 12/2013 | Hole | |
| 2014/0051383 | A1* | 2/2014 | Doerr | H04L 51/20 |
| | | | | 455/405 |
| 2014/0157338 | A1 | 6/2014 | Pearce | |
| 2014/0362742 | A1* | 12/2014 | Martinez | H04M 3/56 |
| | | | | 370/262 |
| 2014/0378108 | A1* | 12/2014 | DeLuca | H04M 3/565 |
| | | | | 455/416 |
| 2016/0072956 | A1* | 3/2016 | Chizi | H04M 3/563 |
| | | | | 455/416 |
| 2016/0212273 | A1* | 7/2016 | Tsypnyatov | H04M 3/562 |
| 2017/0078340 | A1* | 3/2017 | Arora | H04M 3/56 |

OTHER PUBLICATIONS

"O2 Just Call Me", Retrieved from: <<https://www.o2.co.uk/business/products/apps/just-call-me>>, Retrieved on: Jan. 25, 2019, 7 Pages.
"International Search Report and Written Opinion Issued in PCT Patent Application No. PCT/US20/015280", dated May 8, 2020, 11 Pages.

* cited by examiner

BRIDGE TELEPHONE NUMBERS 44

US: +1 (XXX) XXX-XXXX
UK: +44 (XXX) XXX-XXXX
FR: +33 (XX) XXX-XXXX
ES: +34 (XXX) XXX-XXXX
AU: +61 (XX) XXX-XXXX
IN: +91 (XXX) XXX-XXXX
JP: +81 (XXX) XXX-XXXX
...

LIST OF COUNTRY CODES 46

SELECTING BRIDGE TELEPHONE NUMBER FOR DIAL-OUT

BACKGROUND

Internet-based conference meeting systems have been developed that enable participants from different countries to jointly participate in a conference meetings. Some such systems allow participants to connect via computing devices communicating with the system using internet protocol. Further, some such systems enable participants to call in to a conference meeting or to be called back by the system in order to join such a conference meeting, using a telephone connected to a public switched telephone network.

SUMMARY

A conference system is provided that may include a processor that may be configured to provision a plurality of bridge telephone numbers having a plurality of different country codes, and receive a dial-out request for one of a plurality of attendees of a conference meeting for connecting to the conference meeting. The dial-out request may include a target telephone number associated with a communication device of the one of the plurality of attendees. The processor may be further configured to select one of the provisioned plurality of bridge telephone numbers based on a result of a match between at least a country code of the selected bridge telephone number and the target telephone number, and cause dial-out to the target telephone number from the selected bridge telephone number.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows an example list of bridge telephone numbers and associated country codes provisioned by the conference system of FIG. 1.

DETAILED DESCRIPTION

Typical telephone conferencing systems have a default bridge number that is used to dial-out to the telephones of attendees. For example, if the default number is a United States number, that number may be used to dial-out to attendees even if they are located in a different country, such as Japan, causing the dial-out call to be an international long-distance call. International calls may be passed through multiple telephone carriers and service providers when being transferred from one country to another, and may incur greater costs and tolls compared to national and local telephone calls. Additionally, each of these carriers may have different protocols and systems for handling dual-tone multi-frequency (DTMF) signaling, which may potentially cause DTMF signaling to flow improperly when being transferred between carriers using incompatible DTMF methods. Further, users may be accustomed to receiving telephone calls from numbers that adhere to a local format and area code that is recognizable by the user. Receiving a telephone call from a default bridge number originating from another country may potentially cause the user discomfort or unease, as the user may be unsure whether the call is legitimately intended for the user.

Figure 1:
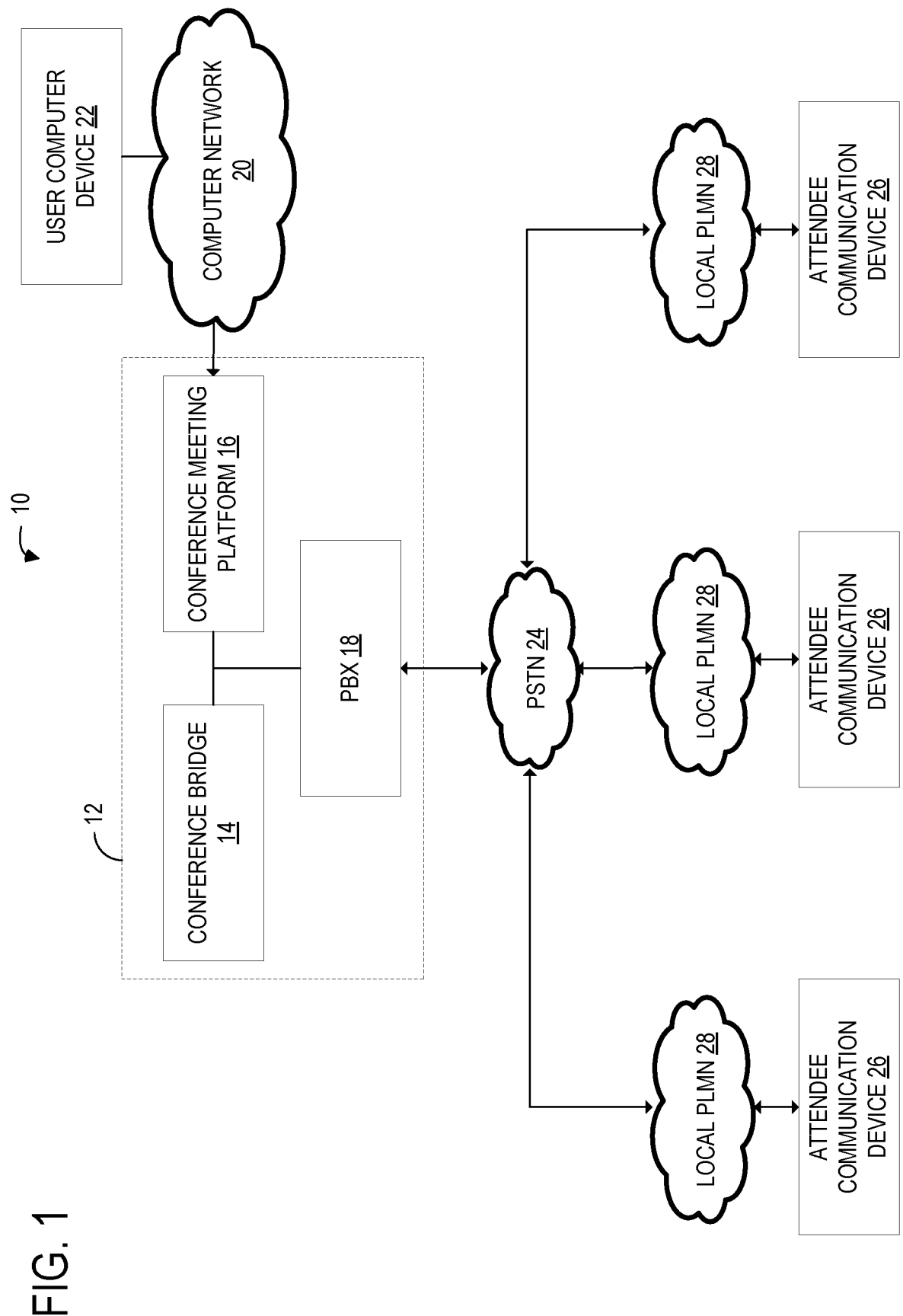
FIG. 1 shows a schematic view of an example telecommunication environment that includes a conference system configured to dial-out to attendees with a local bridge telephone number.

FIG. 1 illustrates shows an example telecommunication environment 10 that controls and manages communications between user devices. The example telecommunication environment 10 includes a conference system 12 that may include a conference bridge 14, a conference meeting platform 16, and a private branch exchange (PBX) 18. The conference system 12 may be communicatively coupled to computer networks 20, which may include a Local Area Network (LAN), a Wide Area Network (WAN), wireless networks, etc. One or more user computer devices 22 may communicate with the conference meeting platform 16 via the computer networks 20 to provision conference meetings on the conference system 12.

The PBX 18 may, for example, take the form of a multiline telephone exchange and switching system that is communicatively coupled to the conference bridge 14 and the conference meeting platform 16. The PBX 18 may take the form of a standard PBX, an IP-PBX, or another suitable type of telephone exchange and switch system. Through the PBX 18, the conference system 12 may communicate with a public switched telephone network (PSTN) 24 that is the aggregate of the world's circuit-switched telephone networks operated by national, regional, and/or local telephone carriers and service providers. The PBX 18 may route incoming and outgoing telephone calls through the PSTN. The PBX 18 may be coupled to the PSTN 24 via direct inward dialing (DID) trunks, primary rate interface (PRI) trunks, or another other suitable networking infrastructure.

As illustrated in FIG. 1, a plurality of attendee communication devices 26 may communicate with the conference system 12 via the PSTN 24 and local public land mobile networks (PLMN) 28. Each PLMN 28 may be a combination of wireless communication services offered by a specific service provider in a specific country. Each PLMN 28 may operate using cellular technologies such as GSM/2G, UMTS/3G, LTE/4G, etc. Each attendee communication device 26 may be associated with a particular local PLMN 28 that manages inbound and outbound communications from that attendee communication device 26. Telephone communications between the attendee communication devices 26 and the PBX 18 of the conference system 12 may be routed by the local PLMNs 28 and the PSTN 24.

The attendee communication devices 26 may take the form of cellular phones, smart phones, tablet computing devices, personal digital assistants (PDA), and other computer devices equipped for cellular communication through the local PLMNs 28 associated with each specific attendee communication device 26. The attendee communication devices 26 may be configured to wirelessly communicate with the local PLMN 28 using radio transceivers and other types of hardware components. The attendee communication devices 26 and local PLMNs 28 may be configured to operate in compliance with wireless protocols, such as, for example, GSM, GPRS, CDMA, EDGE, UMTS, EvDO, HSPA, etc. It should be appreciated that the communication infrastructure illustrated in FIG. 1 may also be used to communicate other types of data, such as emails, computer data packets, etc., between the conference system 12 and each of the attendee communication devices 26. It should further be appreciated that the telecommunication environment 10 is not limited to the specific architecture described above and illustrated in FIG. 1, but may include other telecommunication architecture not specifically described herein.

Figure 2:
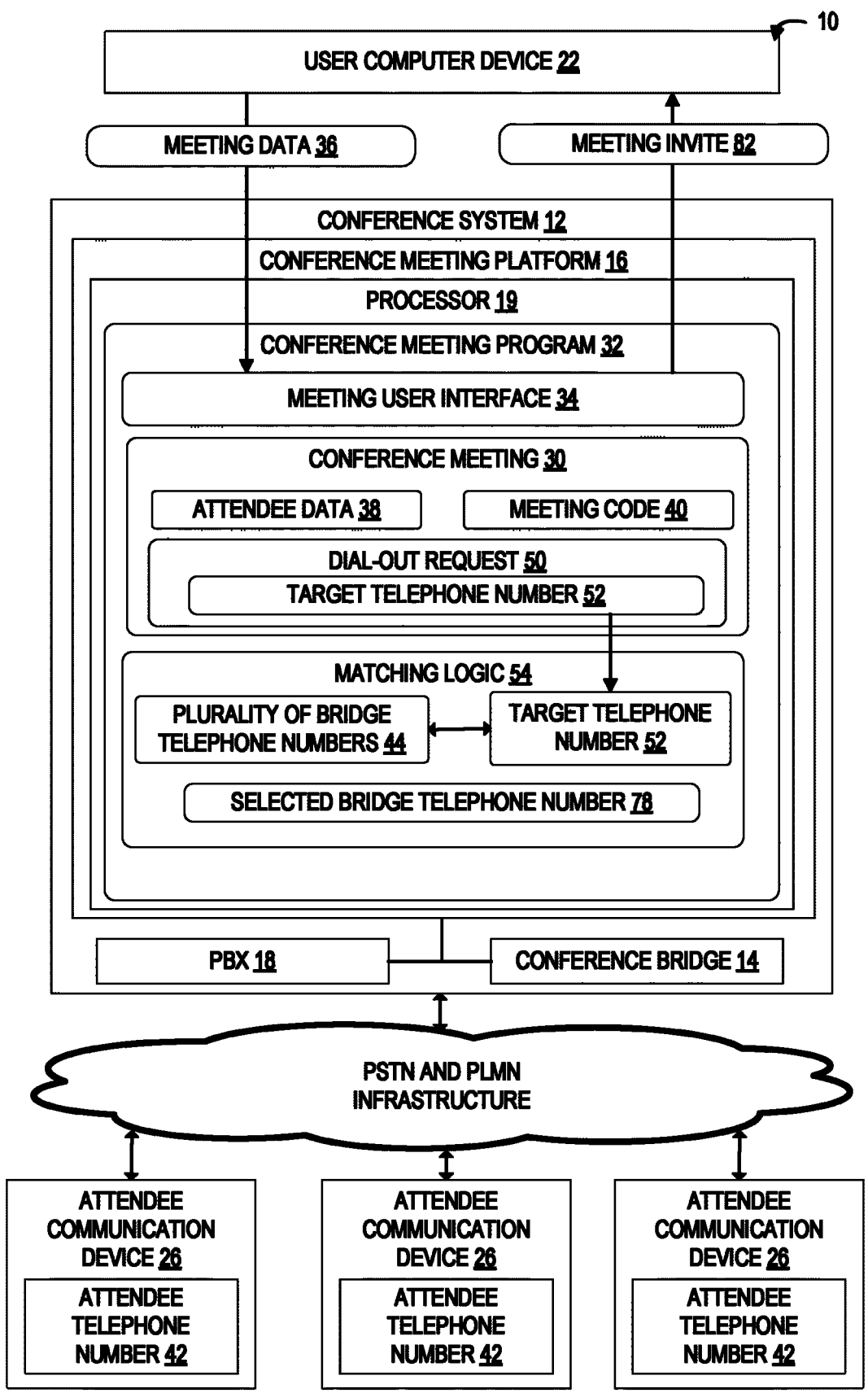
FIG. 2 shows a schematic view of the conference system of FIG. 1.

Turning to FIG. 2, a conference leader may provision a conference meeting 30 on the conference system 12 via the user computer device 22. The user computer device 22 may, for example, take the form of a desktop computing device, a smartphone device, a laptop device, etc. The user computer device 22 may be configured to communicate with the conference meeting platform 16 via the computer network 20. The conference meeting platform 16 includes a processor 19 and other suitable computer components configured to execute a conference meeting program 32. The conference meeting program 32 may be configured to generate and conference meetings 30 for the conference system 12.

The conference leader may access a meeting user interface 34 executed by a processor 19 of the conference meeting platform 16, and input meeting data 36 used to bootstrap the conference meeting 30. For example, the meeting data 36 may include a meeting date, a meeting time, and attendee data such as attendee names, identifications, emails, telephone numbers, etc. It should be appreciated that the meeting data 36 that may be entered by the user via the meeting user interface 34 may include other types of meeting data not specifically described above.

After receiving the meeting data 36, the conference meeting program 32 may be configured to generate the conference meeting 30 and store attendee data 38 for a plurality of attendees of the meeting. The conference meeting program 32 may assign a meeting code 40 to the generated conference meeting 30. At the time of the conference meeting 30, attendees dialing into the meeting may use the assigned meeting code 40 to be placed into the correct conference meeting 30. Each attendee may connect to the conference meeting 30 via their attendee communication device 26. As described above with reference to FIG. 1, communications including in-bound and out-bound calls between the conference system 12 and each attendee communication device 26 may be routed by the PSTN 24 and the PLMNs 28 local to each attendee communication device 26.

The local PLMN 28 for each attendee communication device 26 may assign and manage an attendee telephone number 42 to that attendee communication device 26. Each attendee telephone number 42 may take the form of an E164 routable number that includes a country code having 1-3 digits, and a subscriber number having up to 12 digits. The subscriber number portion of the attendee telephone number 42 may be assigned to the attendee communication device 26 by the local PLMN 28 contracting with the user of the attendee communication device 26.

As discussed above, the attendees of the conference meeting 30 may, in some cases, be located in different countries. Thus, if the number used to dial into the conference meeting 30 has a different country code than the attendee telephone number 42, the conference meeting 30 may become an international long-distance call which may incur fees and may cause other detrimental issues described above.

To address these issues, the conference system 12 is configured to provision a plurality of bridge telephone numbers 44 having a plurality of different country codes. FIG. 3 illustrates several example bridge telephone numbers 44. In the illustrated example, the conference system 12 has provisioned bridge telephone numbers 44 in a plurality of different country code including the United States, United Kingdom, France, etc. For example, the United States bridge telephone number has a country code of 1, and the United Kingdom bridge telephone number has a country code of 44. These bridge telephone numbers may be provisioned from PLMNs 28 local in each country. In one example, the conference system 12 is further configured to store a defined list of country codes 46 associated with the plurality of bridge telephone numbers 44. Each of the country codes 46 for which the conference system 12 provisioned a bridge telephone number 44 is included in the defined list 46. In some examples, the conference system 12 may provision multiple bridge telephone numbers 44 from a particular country. For example, the conference system 12 may provision several US bridge telephone numbers for different local area codes across the US. In these examples, the defined list of country codes 46 would indicate that there is at least one provisioned bridge telephone numbers for the US. The defined list of country codes 46 may be configured as a look-up table to facilitate fast look-ups for which countries currently have a provisioned number in the conference system 12.

Figure 4:
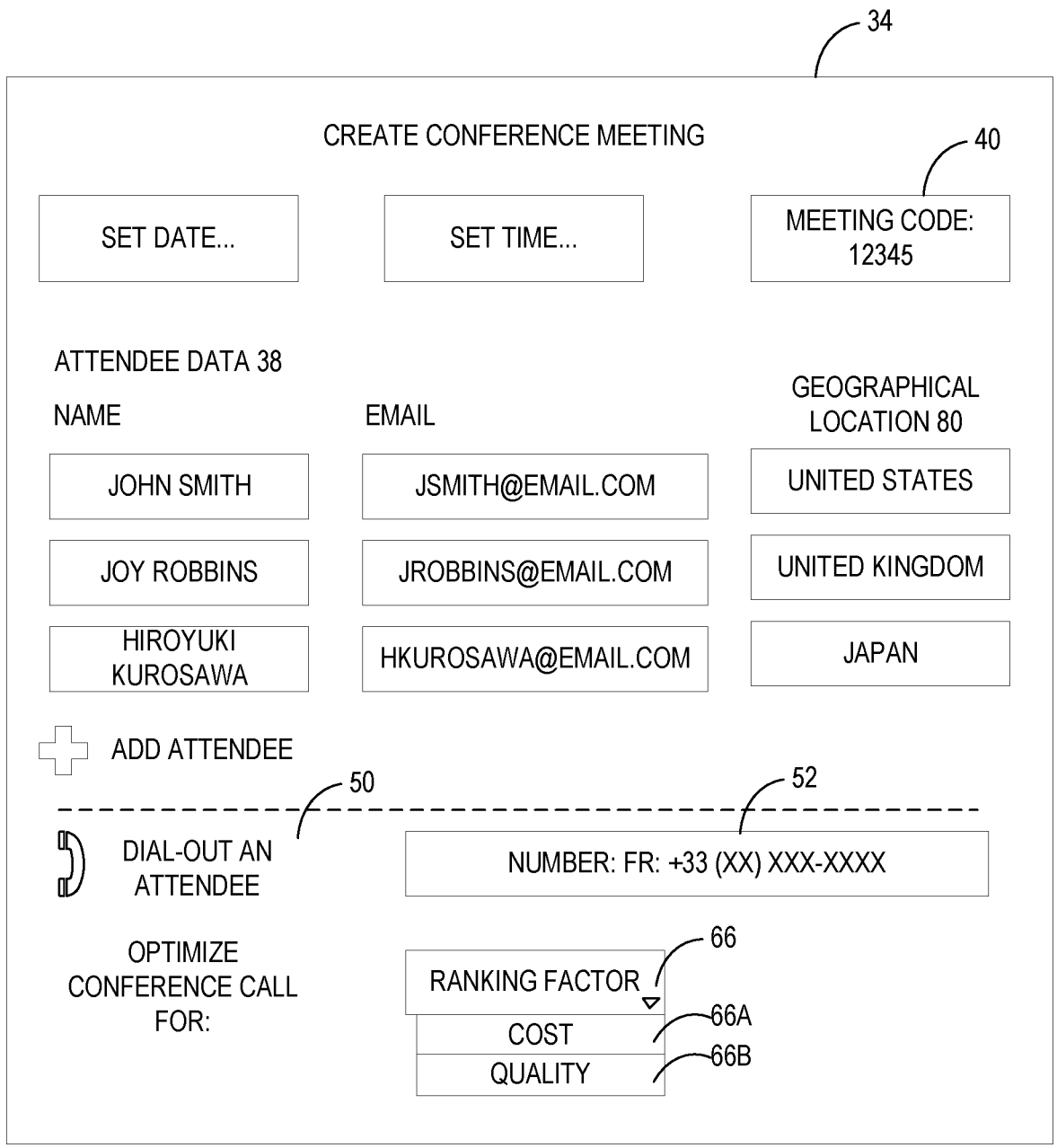
FIG. 4 shows an example user interface to generate a conference meeting using the conference system of FIG. 1.

FIG. 4 illustrates an example meeting user interface 34 for generating a conference meeting 30. Using the user interfaces 34, the conference leader may input various meeting data 36, such as, for example, setting a date for the meeting, setting a time for the meeting, adding attendees to the meeting, etc. As illustrated, the conference meeting 30 may include attendee data 38, such as, for example, the names of attendees, emails of attendees, and locations of attendees. In one example, all of the attendee data 38 may be entered by the conference leader via the user interfaces 34. In another example, portions of the attendee data 38 may be autocompleted by the conference system 12. For example, if the conference system 12 is part of an enterprise and has access to employee data, then the conference meeting platform 16 may be configured to access that data to autocomplete attendee data 38 such as emails and known locations. The attendee data 38 may be used when sending meeting invites 48 to the attendees via email or another suitable communication method. At the time of the conference meeting, the attendees may use the meeting invite, which may include a bridge telephone number 44 and the meeting code 40, to dial into the conference meeting 30.

As illustrated in FIG. 4, the conference leader may also instruct the conference system 12 to dial out to an attendee to immediately add them to the meeting. For example, if the conference meeting is already underway, the conference leader or another attendee of the meeting may make a dial-out request 50 to the user interface to instruct the conference system 12 to dial out to a particular telephone number. The conference system 12 may be configured to receive the dial-out request 50 for one of the plurality of attendees of the conference meeting for connecting to the conference meeting, the dial-out request including a target telephone number 52 associated with the communication device of the one of the plurality of attendees. In another example, the dial-out request 50 may originate from one of the attendees that request to be dialed-out rather than dialing in themselves.

Figure 5:
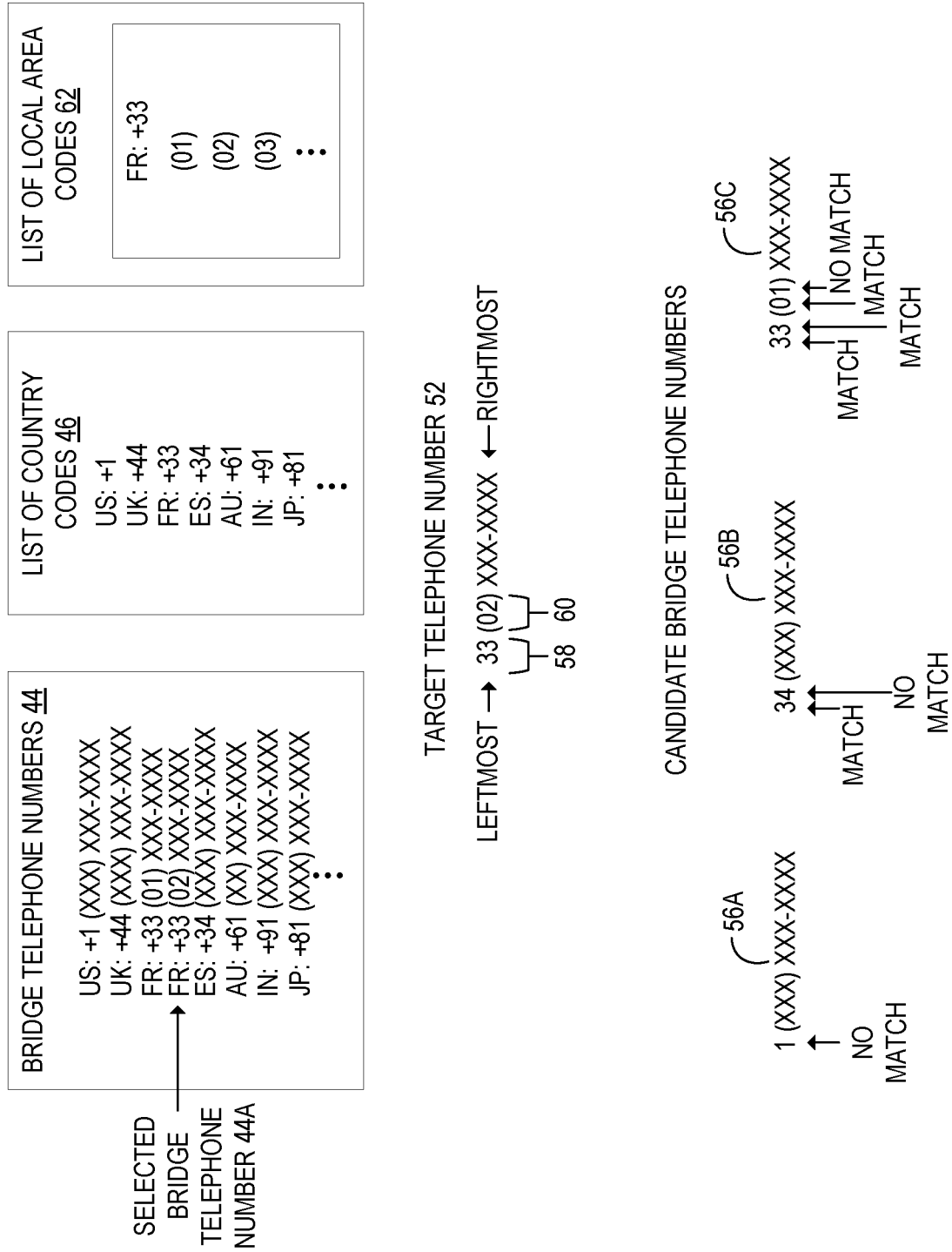
FIG. 5 shows an example of matching logic for matching target telephone numbers to bridge telephone numbers for the conference system of FIG. 1.

After receiving the dial-out request 50, the conference system 12 may be further configured to match the target telephone number 52 to the plurality of bridge telephone numbers 44 and select one of the provisioned plurality of bridge telephone numbers based on a result of a match between at least a country code of the selected bridge telephone number 78 and the target telephone number 52. The conference system 12 may use any suitable matching logic 54. In one example, the conference system 12 may execute matching logic 54 to perform a regular expression matching between the target telephone number 52 and each of the provisioned plurality of bridge telephone numbers 44, and select a bridge telephone number from the plurality of bridge telephone numbers having a closest match. FIG. 5 illustrates an example result of regular expression matching the target telephone number 52. FIG. 5 illustrates three candidate bridge telephone numbers 56 that the target telephone number 52 is matched against, though it should be appreciated that the target telephone number 52 is matched against each of the plurality of bridge telephone numbers 44.

As illustrated, the regular expression matching logic is configured to compare each number moving from a left most number to a rightmost number of each telephone number. In the specific example illustrated in FIG. 5, the leftmost number of the target telephone number 52 is '3'. The leftmost number of the first candidate bridge telephone number 56A is '1', and thus does not match. The leftmost number of the second candidate bridge telephone number 56B is '3', and thus does match. The leftmost number of the third candidate bridge telephone number 56C is also '3', and thus does match. Continuing, the second leftmost number of the target telephone number 52 is compared to the candidate bridge telephone numbers. In one example, the closest match is determined based on a longest sequence of matching numbers. In this manner, the conference system 12 may determine that the third candidate bridge telephone number 56C has a closet match to the target telephone number 52. While FIG. 5 only illustrates an example of regular expression matching the country code portion 58 of the target telephone number 52 and the bride telephone numbers 44, it should be appreciated that the regular expression matching process described above may continue in sequence from the leftmost number to the rightmost number.

Thus, the regular expression matching may continue to further match the local area code portion 60 of the target telephone number 52 to the bridge telephone numbers 44. In the illustrated example, the third leftmost number matches, but the fourth leftmost number does not match. In this manner, the longest sequence of matching number from left to right is three. However, if one of the provisioned bridge telephone numbers was a French number from the '02' area code, then the longest sequence would be four, and the matching logic would select that particular bridge telephone number. In this manner, if the conference system 12 has provisioned multiple bridge telephone numbers having the same country code but different local area codes, the regular expression matching may nonetheless determine a closet match that includes both the country code and the local area code.

In another example, the conference meeting platform 16 of the conference system 12 may be configured to store the defined list 46 of country codes associated with the plurality of bridge telephone numbers 44. For example, the country code portion 58 of each of the plurality of bridge telephone numbers 44 may be extracted, sorted, and stored in the defined list 46 along with its associated bridge telephone number 44. In this example, the matching logic 54 may be configured to compare a country code 58 of the target telephone number 52 to the defined list 46 of country codes. That is, the matching logic 54 may be configured to extract the country code 58, which is one to three digits long for E164 routable numbers, and compare the extracted country code 58 to the defined list 46. If the extracted country code 58 is in the defined list 46, then the matching logic 54 may select a bridge telephone number from the plurality of bridge telephone numbers 44 having a matching country code 58.

In one example, the conference system 12 may not have provisioned a bridge telephone number for every country with a country code 58. After performing the look-up process, if the country code 58 of the target telephone number 52 does not have a match in the defined list 46 of country codes associated with the plurality of bridge telephone numbers 44, the matching logic 54 may be further configured to compare known geographical locations of countries that are in the defined list 46 to the extracted country code 58 of the target telephone number 52. For example, the matching logic 54 may be configured to group country codes by geographical regions, such as, for example, North America, South America, Western Europe, Eastern Europe, South East Asian, Oceanic, etc. The matching logic 54 may then determine which country code 58 in the defined list 46 of country codes has a nearest associated geographical location to the country code of the target telephone number 52, and select the bridge telephone number 44 having the determined country code. For example, the matching logic 54 may be configured to select a country code from the defined list 46 of country codes that is in a same region as the extracted country code of the target telephone number 52.

In one example, the matching logic 54 may be configured to perform a similar look-up process with local area codes. The matching logic 54 may be configured to store a defined list 62 of local area codes 60 for each country code 58 associated with the plurality of bridge telephone numbers 44. After performing a country code lookup and finding a match, the matching logic 54 may be further configured to extract a local area code 60 out of the target telephone number 52 and compare the local area code 60 of the target telephone number 52 to the defined list 62 of local area codes for the determined country code 58. The matching logic 54 may select a bridge telephone number from the plurality of bridge telephone numbers 44 having a nearest matching local area code. In the illustrated example, the matching logic 54 determined that the country code 58 for the target telephone number 52 is for France, and then compares the local area code 60 of the target telephone number 52 to the defined list 62 of area codes for all French bridge telephone numbers that have been provisioned. As shown, the nearest matching local area code is the '02' local area code, which is a direct match. Accordingly, the matching logic 54 may select the bridge telephone number 44A for dialing out to the target telephone number 52.

Typically, selecting the bridge telephone number 44 that is most local to the target telephone number 52 for dialing out will minimize costs and maximize quality of the telephone call due to minimizing the number of hops between telephone carriers and service providers. However, in some cases, due to carrier incompatibilities, network disruptions, local rates and fees, and other factors, the most local bridge telephone number may not be both the cheapest and highest quality number for dialing out to the target telephone number 52. In other cases, the conference system 12 may not have provisioned a bridge telephone number for a specific area code, and the geographical nearest country may not necessarily provide the lowest cost and/or highest quality due to infrastructural differences between countries.

In one example, the conference system 12 may be configured to provide a user adjustable setting for a conference leader to select a ranking factor that includes a cost ranking factor and a quality ranking factor. As illustrated in FIG. 4, the example user interface 34 may include a user adjustable setting configured to receive a selection of the ranking factor 66 from a plurality of different ranking factors. In the illustrated example, the user may select between the cost ranking factor 66A and the quality ranking factor 66B. However, it should be appreciated that other types ranking factors 66 may be used to rank the plurality of bridge telephone numbers for dialing out to the target telephone number 52.

Figure 6:
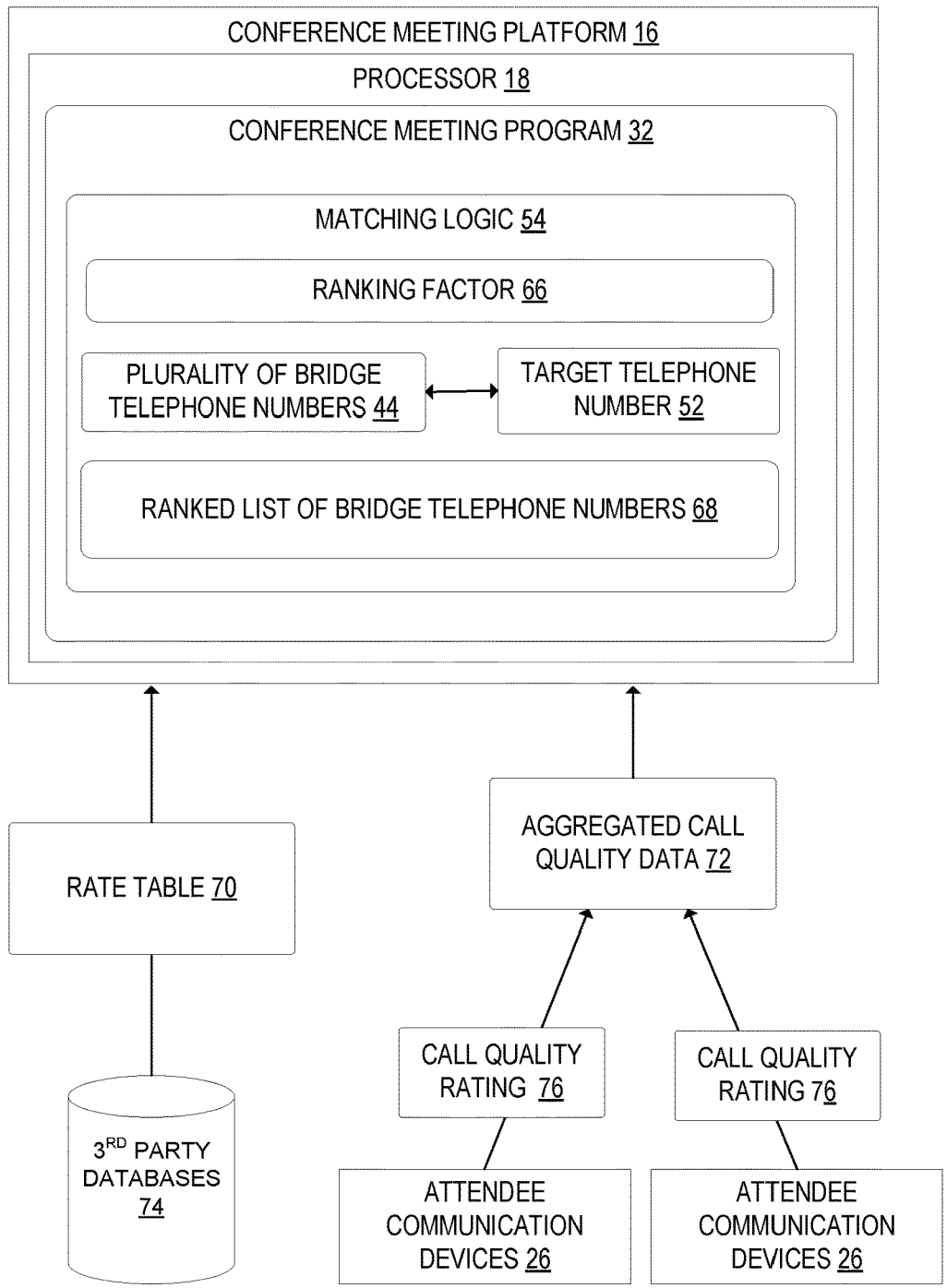
FIG. 6 shows another example of matching logic for the conference system of FIG. 1.

Turning to FIG. 6, the matching logic 54 of the conference meeting program 32 may be configured to rank the plurality of bridge telephone numbers 44 based on a ranking factor 66 and the target telephone number 52, and generate a ranked list 68 of bridge telephone numbers 54. As illustrated, the matching logic 54 may be configured to rank the bridge telephone numbers 68 based on a collection of data including a rate table 70 and aggregated call quality data 72. The rate table 70 may be generated based on data collected from 3rd party database 74, such as, for example, PSTN and PLMN databases that list their rates to transfer between each other. Using the rate table 70, the matching logic 54 may be configured to calculate a total rate cost to route calls between each bridge telephone number and the target telephone number 52. Thus, if the selected ranking factor is a cost ranking factor, the matching logic 54 may be configured to assign the cheapest route with a highest rank in the ranked list 68.

The aggregated call quality data 72 may be aggregated from user input collected from the multitude of attendee communication devices 26 after each call. That is, once a call has been finished, the attendee communication device 26 may be configured to prompt the user to enter a rating for the quality of the call. The rating may reflect, for example, a sound quality, latency, disruptions, errors in DTMF flow, and other issues that may impact user experience during the call. The call quality ratings 76 may be aggregated together into the aggregated call quality data 72 and stored/managed by the conference meeting platform 16. The matching logic 54 may be configured to calculate an expected call quality rating for the routes between each bridge telephone number and the target telephone number 52. Thus, if the selected ranking factor is a call quality ranking factor, the matching logic 54 may be configured to assign the highest quality route with a highest rank in the ranked list 68. In either of these examples, the matching logic 54 may then be configured to select a bridge telephone number having a highest rank for dial-out to the target telephone number 52.

In the above examples of matching logic 54, the selected bridge telephone number was selected from among pre-provisioned bridge telephone numbers. However, it should be appreciated that the matching logic 54 described above may be used to dynamically select a bridge telephone number without prior-provisioning of specific bridge telephone numbers. For example, the target telephone number 52 may be matched to known country codes and/or local area codes as described above with reference to FIG. 5. Next, the conference system 22 may be configured to communicate with a PLMN that operates in the matched country code and/or local area code to dynamically provision a bridge telephone number with the matched country code and/or local area code. The dynamically selected bridge telephone number may then be used to dial-out to the target telephone number 52 as described herein.

Turning back to FIG. 2, after the matching logic 54 selects a bridge telephone number 78 according to the processes described above, the conference system 12 may be configured to dial-out to the target telephone number 52 from the selected bridge telephone number 78. By dialing out to the target telephone number 52 from a provisioned bridge telephone number that is the most local to the target telephone number 52 rather than a default number, the conference system 12 provides the potential advantages of reducing costs incurred by fees and tolls, improving call quality, and reducing the chance of improper DTMF signaling flow.

The matching processes described above may also be used to achieve these benefits for dial-in calls from attendees joining the conference meeting. In the example illustrated in FIG. 4, the conference leader input attendee data 38 for a plurality of attendees. The conference system 12 may be configured to determine geographical locations 80 of each of the plurality of attendees. In one example, the geographical locations 80 of the attendees may be determined based on the attendee data 38 input by the user, such as a direct input of the geographical locations 80. In another example, the geographical locations 80 may be determined based on centralized directory data such as a company-maintained employee directory, or based on other data sources or cached history, such as, for example, email country code, returned internet protocol address, etc. If telephone numbers for the attendees dialing into the meeting have been entered as part of the attendee data 38, then the conference system 12 may determine geographical locations of the attendees based on the country codes of the telephone numbers.

The matching logic 54 of the conference meeting program 22 may be configured to match bridge telephone numbers to each of the plurality of attendees based on determined geographical locations 80. In the example illustrated in FIG. 4, the attendee 'John Smith' has a determined geographical location 80 of the United States. Thus, the matching logic 54 may be configured to match a bridge telephone number having the United States country code to the attendee 'John Smith'. As another example, if the attendee data 38 includes attendee telephone numbers, then the matching logic 54 may be configured to match bridge telephone numbers as described above.

After the conference meeting 30 has been generated, the conference system 12 may be configured to send a conference meeting invites 82 to each of the plurality of attendees. The conference meeting invites 82 may take the form of an email, an instant message, or another suitable communication form. In the example illustrated in FIG. 1, the conference meeting invite 82 is depicted as being sent to the user computer device 22. However, it should be appreciated that the conference meeting invites 82 may be accessed by the attendee communication devices 26, and other networked computer devices of the attendees.

Figure 7:
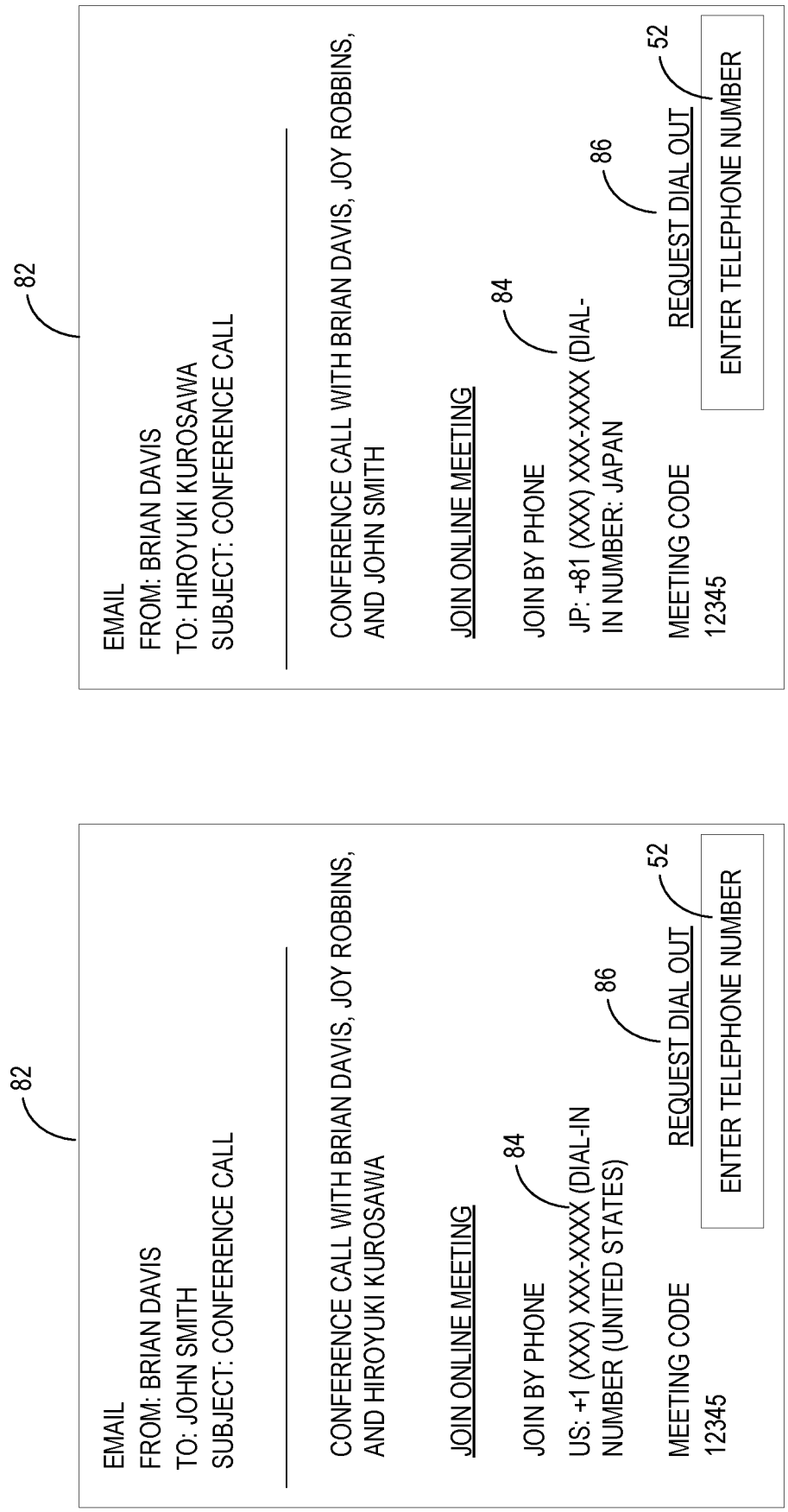
FIG. 7A shows an example conference meeting invite sent by the conference system of FIG. 1.
FIG. 7B shows another example conference meeting invite sent by the conference system of FIG. 1.

FIGS. 7A and 7B show example conference meeting invites sent to the attendees 'John Smith' and 'Hiroyuki Kurosawa' respectively. As illustrated, each conference meeting invite 82 includes a matched bridge telephone number 84 for that attendee. As John Smith was determined to be located in the United States, a bridge telephone number with a United State country code was automatically matched to John Smith and provided in the example conference meeting invite 82 of FIG. 7A. On the other hand, as Hiroyuki Kurosawa was determined to be located in Japan, a bridge telephone number with a Japanese country code was automatically matched to Hiroyuki Kurosawa and provided in the example conference meeting invite 82 of FIG. 7B. Thus, each conference meeting invite is personalized to each attendee to include dial-in bridge telephone numbers that are local to that particular attendee. Each conference meeting invite 82 may also include an element to request a dial-out 86. The attendee may enter a target telephone number 52, and request that the conference system 12 should dial-out to the target telephone number 52 at the time of the meeting. The request for the dial-out 86 may be handled according to the processes discussed above.

Figure 8:
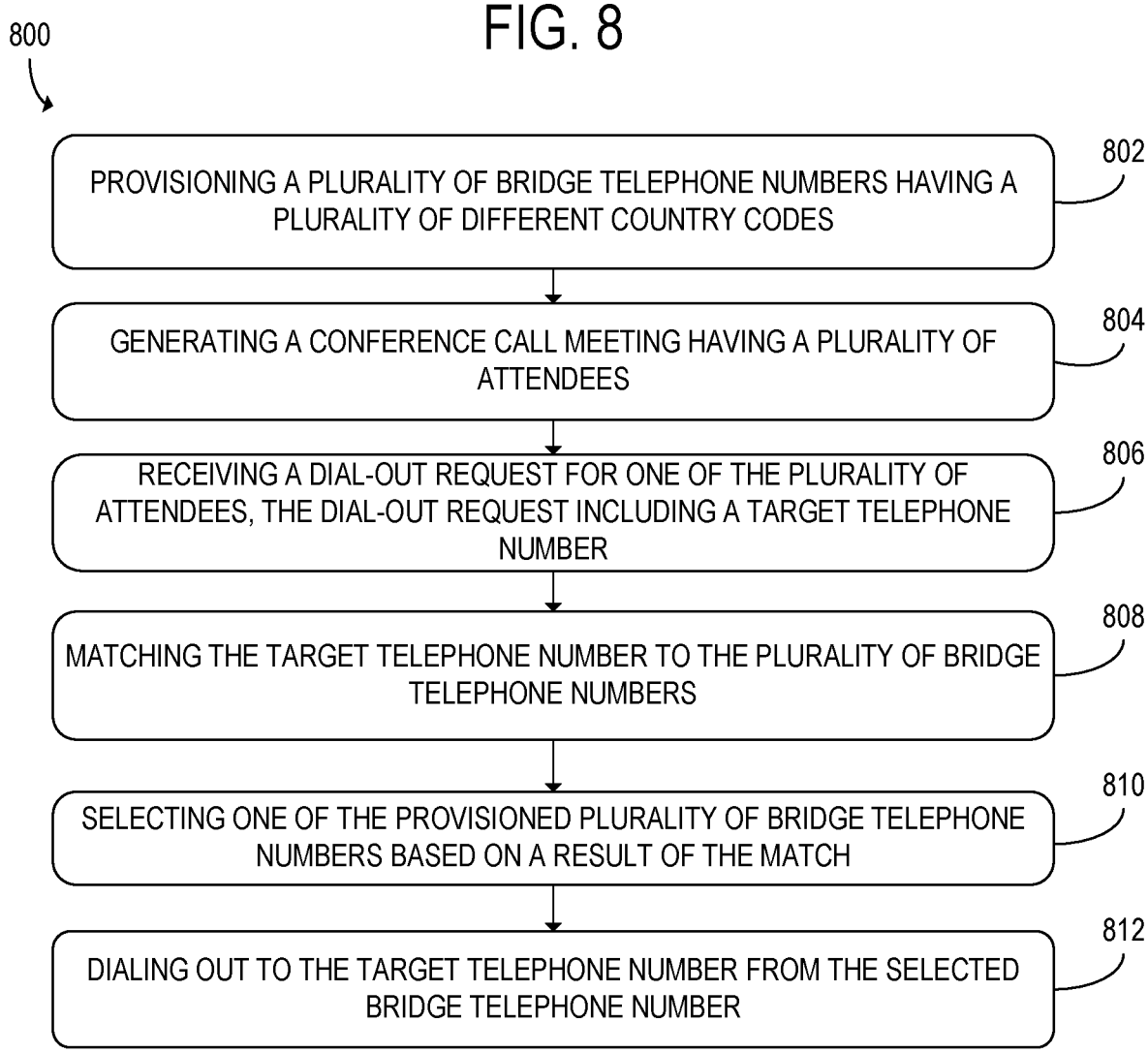
FIG. 8 shows a flowchart for a computer-implemented method for dialing out to attendees with a local bridge telephone number implemented by the conference system of FIG. 1.

FIG. 8 shows a flowchart of a computer-implemented method 800. The method 800 may be implemented by the conference system 12 of FIG. 1. At 802, the method 800 may include provisioning a plurality of bridge telephone numbers having a plurality of different country codes. Bridge telephone numbers are illustrated with reference to FIG. 3. As shown, the provisioned bridge telephone numbers 44 cover a plurality of different country codes including the United States, United Kingdom, France, etc. For example, the United States bridge telephone number has a country code of 1, and the United Kingdom bridge telephone number has a country code of 44. These bridge telephone numbers may be provisioned from PLMNs 28 local in each country.

At 804, the method 800 may include generating a conference meeting having a plurality of attendees. A conference leader may provision a conference meeting via a meeting user interface illustrated with reference to FIG. 4. The conference leader may input meeting data 36 used to bootstrap the conference meeting 30. For example, the meeting data 36 may include a meeting date, a meeting time, and attendee data such as attendee names, identifications, emails, telephone numbers, etc.

At 806, the method 800 may include receiving a dial-out request for one of the plurality of attendees of a conference meeting for connecting to the conference meeting, the dial-out request including a target telephone number associated with a communication device of the one of the plurality of attendees. The dial-out may be requested by an attendee via a meeting invite. To request the dial-out, the attendee enters a target telephone number. In another example, the dial-out may be requested during the meeting by one of the attendees. If a current attendee wants to add a new person to the ongoing conference meeting, the conference leader or one of the attendees may request a dial-out to a target telephone number of the desired addition.

At 808, the method 800 may include matching the target telephone number to the plurality of bridge telephone numbers. The target telephone number may be matched to the plurality of bridge telephone numbers via several optional and/or alternative methods described in more detail with reference to FIG. 9.

At 810, the method 800 may include selecting one of the provisioned plurality of bridge telephone numbers based on a result of a match between at least a country code of the selected bridge telephone number and the target telephone number. The match may be performed at step 808, as described above. The selected bridge telephone number may be a most local number to the target telephone number of the bridge telephone numbers.

At 812, the method 800 may include causing dial-out out to the target telephone number from the selected bridge telephone number. By dialing out to the target telephone number from a provisioned bridge telephone number that is the most local to the target telephone number rather than a default number, method 800 provides the potential advantages of reducing costs incurred by fees and tolls, improving call quality, and reducing the chance of improper DTMF signaling flow.

Figure 9:
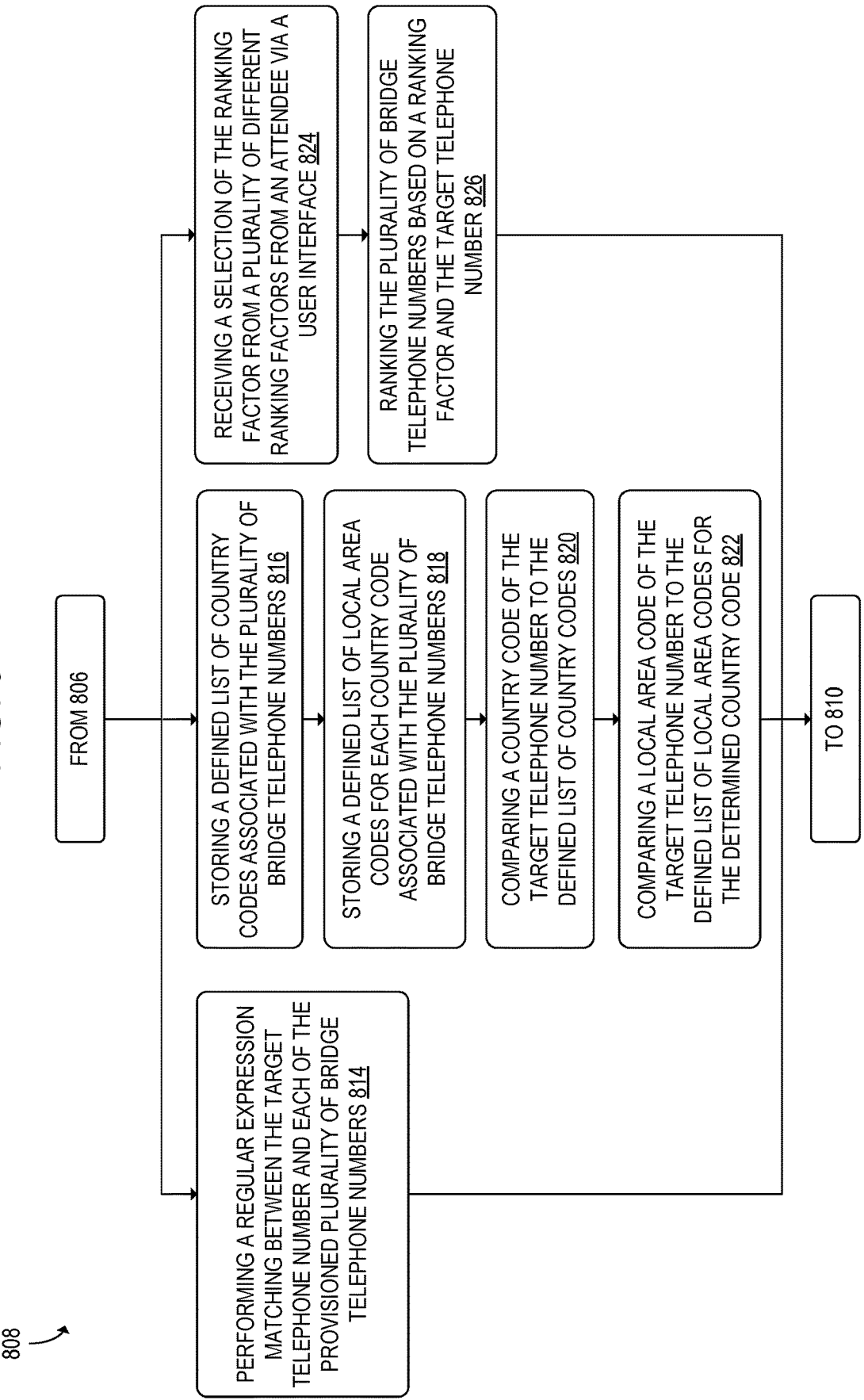
FIG. 9 shows an expanded view of a step of the flowchart of FIG. 8.

FIG. 9 shows additional steps that may be included at step 808 of the method 800. In a first example, step 808 may include step 814. In a second example, step 808 may include steps 816-822. In a third example, step 808 may include steps 824 and 826. The three paths may be performed optionally or alternatively to each other.

In the first path, at 814, the method 800 may include performing a regular expression matching between the target telephone number and each of the provisioned plurality of bridge telephone numbers. An example result of regular expression matching is described above with reference to FIG. 5. As illustrated, the regular expression matching logic is configured to compare each number moving from a left most number to a right most number of each telephone number. Advancing from step 814 to step 810, the method 800 may include selecting a bridge telephone number from the plurality of bridge telephone numbers having a closest match. In one example, the closest match is determined based on a longest sequence of matching numbers.

In the second path, at 816, the method 800 may include storing a defined list of country codes associated with the plurality of bridge telephone numbers. As described above with reference to FIG. 3, each of the country codes 46 for which the conference system 12 provisioned a bridge telephone number 44 is included in the defined list 46. In some examples, the conference system 12 may provision multiple bridge telephone numbers 44 from a particular country. For example, the conference system 12 may provision several US bridge telephone numbers for different local area codes across the US. In these examples, the defined list of country codes 46 would indicate that there is at least one provisioned bridge telephone numbers for the US. The defined list of country codes 46 may be configured as a look-up table to facilitate fast look-ups for which countries currently have a provisioned number in the conference system 12.

At 818, the method 800 may include storing a defined list of local area codes for each country code associated with the plurality of bridge telephone numbers. For each country code identified at step 816, a local area code of the one or more bridge telephone numbers having that country code may be extracted and added to the defined list.

At 820, the method 800 may include comparing a country code of the target telephone number to the defined list of country codes. The country code may be extracted from the first one to three digits of the target telephone number. The extracted country code may then be compared to the defined list.

At 822, the method 800 may include comparing a local area code of the target telephone number to the defined list of local area codes for the determined country code. If the extracted country code of the target telephone number results in multiple bridge telephone numbers in the defined table, then the local area code of the target telephone number may also be extracted and compared to the defined list.

Advancing from step 822 to step 810, the method 800 may include selecting a bridge telephone number from the plurality of bridge telephone numbers having a matching country code. In one example, step 810 may further include selecting a bridge telephone number from the plurality of bridge telephone numbers having a nearest matching local area code.

In the third path, at step 824, the method 800 may include receiving a selection of the ranking factor from a plurality of different ranking factors from an attendee via a user interface. The ranking factor may include a cost ranking factor and a quality ranking factor. FIG. 4 illustrates an example user interface that may be used by the conference leader to select the ranking factor 66.

At 826, the method 800 may include ranking the plurality of bridge telephone numbers based on a ranking factor and the target telephone number. FIG. 6 illustrates different types of data that may be used to rank the bridge telephone numbers. As described above with reference to FIG. 6, rate table data 70 and aggregated call quality data 72 may be used to determine a ranked list of bridge telephone numbers 68. Advancing from step 826 to step 810, the method 800 may include selecting a bridge telephone number having a highest rank.

In some examples, the three paths may all be performed, or two of the three paths may be performed, during the method 800. After step 810, the method 800 may continue as shown in FIG. 8.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
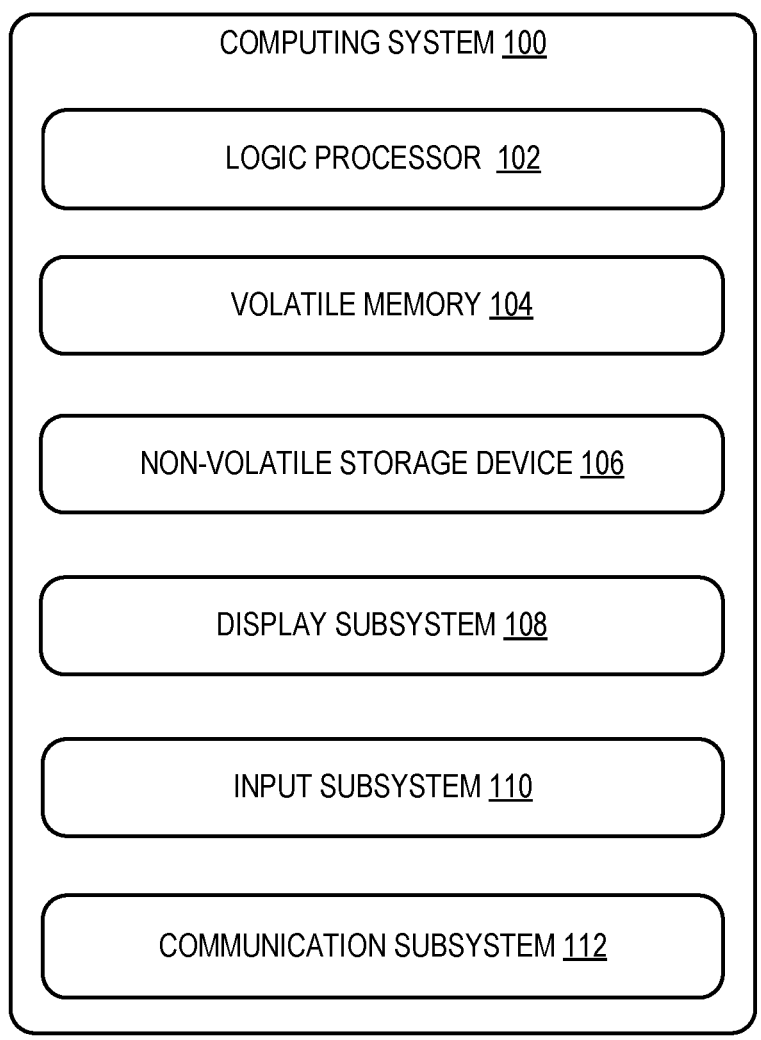
FIG. 10 is a schematic view of an example computing environment in which the conference system of FIG. 1 may be enacted.

FIG. 10 schematically shows a non-limiting embodiment of a computing system 100 that can enact one or more of the methods and processes described above. Computing system 100 is shown in simplified form. Computing system 100 may embody the conference system 12, user computer device 22, and the attendee communication devices 26 described above and illustrated in FIGS. 1 and 2. Computing system 100 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 100 includes a logic processor 102 volatile memory 104, and a non-volatile storage device 106. Computing system 100 may optionally include a display subsystem 108, input subsystem 110, communication subsystem 112, and/or other components not shown in FIG. 10.

Logic processor 102 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 106 includes one or more physical devices configured to hold instructions executable by the logic processors to implement the methods and processes described herein. When such methods and processes are implemented, the state of non-volatile storage device 106 may be transformed—e.g., to hold different data.

Non-volatile storage device 106 may include physical devices that are removable and/or built-in. Non-volatile storage device 106 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 106 may include nonvolatile, dynamic, static, read/write, read-only, sequential-access, location-addressable, file-addressable, and/or content-addressable devices. It will be appreciated that non-volatile storage device 106 is configured to hold instructions even when power is cut to the non-volatile storage device 106.

Volatile memory 104 may include physical devices that include random access memory. Volatile memory 104 is typically utilized by logic processor 102 to temporarily store information during processing of software instructions. It will be appreciated that volatile memory 104 typically does not continue to store instructions when power is cut to the volatile memory 104.

Aspects of logic processor 102, volatile memory 104, and non-volatile storage device 106 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 100 typically implemented in software by a processor to perform a particular function using portions of volatile memory, which function involves transformative processing that specially configures the processor to perform the function. Thus, a module, program, or engine may be instantiated via logic processor 102 executing instructions held by non-volatile storage device 106, using portions of volatile memory 104. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 108 may be used to present a visual representation of data held by non-volatile storage device 106. The visual representation may take the form of a graphical user interface (GUI). As the herein described methods and processes change the data held by the non-volatile storage device, and thus transform the state of the non-volatile storage device, the state of display subsystem 108 may likewise be transformed to visually represent changes in the underlying data. Display subsystem 108 may include one or more display devices utilizing virtually any type of technology. Such display devices may be combined with logic processor 102, volatile memory 104, and/or non-volatile storage device 106 in a shared enclosure, or such display devices may be peripheral display devices.

When included, input subsystem 110 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 112 may be configured to communicatively couple various computing devices described herein with each other, and with other devices. Communication subsystem 112 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 100 to send and/or receive messages to and/or from other devices via a network such as the Internet.

The following paragraphs provide additional support for the claims of the subject application. One aspect provides a conference system comprising a processor. The processor is configured to provision a plurality of bridge telephone numbers having a plurality of different country codes, and receive a dial-out request for one of the plurality of attendees of a conference meeting for connecting to the conference meeting. The dial-out request includes a target telephone number associated with a communication device of the one of the plurality of attendees. The processor is further configured to select one of the provisioned plurality of bridge telephone numbers based on a result of a match between at least a country code of the selected bridge telephone number and the target telephone number, and cause dial-out to the target telephone number from the selected bridge telephone number. In this aspect, additionally or alternatively, to select the one of the provisioned plurality of bridge telephone numbers, the processor may be configured to perform a regular expression matching between the target telephone number and each of the provisioned plurality of bridge telephone numbers, and select a bridge telephone number from the plurality of bridge telephone numbers having a closest match. In this aspect, additionally or alternatively, the processor may be configured to determine the closest match based on a longest sequence of matching numbers. In this aspect, additionally or alternatively, to select the one of the provisioned plurality of bridge telephone numbers, the processor may be configured to store a defined list of country codes associated with the plurality of bridge telephone numbers, compare a country code of the target telephone number to the defined list of country codes, and select a bridge telephone number from the plurality of bridge telephone numbers having a matching country code. In this aspect, additionally or alternatively, if the country code of the target telephone number does not have a match in the defined list of country codes associated with the plurality of bridge telephone numbers, the processor may be configured to determine which country code in the defined list of country codes has a nearest associated geographical location to the country code of the target telephone number, and select the bridge telephone number having the determined country code. In this aspect, additionally or alternatively, to select the bridge telephone number, the processor may be further configured to store a defined list of local area codes for each country code associated with the plurality of bridge telephone numbers, compare a local area code of the target telephone number to the defined list of local area codes for the determined country code, and select a bridge telephone number from the plurality of bridge telephone numbers having a nearest matching local area code. In this aspect, additionally or alternatively, to select the bridge telephone number, the processor may be configured to rank the plurality of bridge telephone numbers based on a ranking factor and the target telephone number, and select a bridge telephone number having a highest rank. In this aspect, additionally or alternatively, the ranking factor may include a cost ranking factor and a quality ranking factor. In this aspect, additionally or alternatively, the processor may be configured to receive a selection of the ranking factor from a plurality of different ranking factors from an attendee via a user interface. In this aspect, additionally or alternatively, the processor may be configured to determine geographical locations of each of the plurality of attendees, match bridge telephone numbers to each of the plurality of attendees based on determined geographical locations, and send a conference meeting invites to each of the plurality of attendees. Each conference meeting invite may include a matched bridge telephone number for that attendee.

Another aspect provides a method comprising, at a processor of a conference system, provisioning a plurality of bridge telephone numbers having a plurality of different country codes, and receiving a dial-out request for one of the plurality of attendees of a conference meeting for connecting to the conference meeting. The dial-out request includes a target telephone number associated with a communication device of the one of the plurality of attendees. The method further comprises selecting one of the provisioned plurality of bridge telephone numbers based on a result of a match between at least a country code of the selected bridge telephone number and the target telephone number, and causing dial-out to the target telephone number from the selected bridge telephone number. In this aspect, additionally or alternatively, selecting the one of the provisioned plurality of bridge telephone numbers may further comprise performing a regular expression matching between the target telephone number and each of the provisioned plurality of bridge telephone numbers, and selecting a bridge telephone number from the plurality of bridge telephone numbers having a closest match. In this aspect, additionally or alternatively, the closest match may be determined based on a longest sequence of matching numbers. In this aspect, additionally or alternatively, selecting the one of the provisioned plurality of bridge telephone numbers may further comprise storing a defined list of country codes associated with the plurality of bridge telephone numbers, comparing a country code of the target telephone number to the defined list of country codes, and selecting a bridge telephone number from the plurality of bridge telephone numbers having a matching country code. In this aspect, additionally or alternatively, if the country code of the target telephone number does not have a match in the defined list of country codes associated with the plurality of bridge telephone numbers, the method may further comprise determining which country code in the defined list of country codes has a nearest associated geographical location to the country code of the target telephone number, and selecting the bridge telephone number having the determined country code. In this aspect, additionally or alternatively, selecting the bridge telephone number may further comprise storing a defined list of local area codes for each country code associated with the plurality of bridge telephone numbers, comparing a local area code of the target telephone number to the defined list of local area codes for the determined country code, and selecting a bridge telephone number from the plurality of bridge telephone numbers having a nearest matching local area code. In this aspect, additionally or alternatively, selecting the bridge telephone number may further comprise ranking the plurality of bridge telephone numbers based on a ranking factor and the target telephone number, and selecting a bridge telephone number having a highest rank. In this aspect, additionally or alternatively, the ranking factor may include a cost ranking factor and a quality ranking factor. In this aspect, additionally or alternatively, the method may further comprise receiving a selection of the ranking factor from a plurality of different ranking factors from an attendee via a user interface.

Another aspect provides a conference system comprising a processor. The processor is configured to receive a dial-out request for one of a plurality of attendees of a conference meeting for connecting to the conference meeting. The dial-out request includes a target telephone number associated with a communication device of the one of the plurality of attendees. The processor is further configured to select a bridge telephone number based on a result of a regular expression matching between a plurality of bridge telephone numbers and the target telephone number, the selected bridge telephone number having a longest sequence of matching numbers compared to other bridge telephone numbers of the plurality of bridge telephone numbers. The processor is further configured to cause dial-out to the target telephone number from the selected bridge telephone number.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A conference system comprising:
a processor configured to:
provision a plurality of bridge telephone numbers having a plurality of different country codes;
receive a dial-out request for one of a plurality of attendees of a conference meeting for connecting to the conference meeting, the dial-out request including a target telephone number associated with a communication device of the one of the plurality of attendees;
select one of the provisioned plurality of bridge telephone numbers based on a result of a match between at least a country code of the selected bridge telephone number and the target telephone number; and
cause dial-out to the target telephone number from the selected bridge telephone number.

2. The conference system of claim 1, wherein to select the one of the provisioned plurality of bridge telephone numbers, the processor is configured to:
perform a regular expression matching between the target telephone number and each of the provisioned plurality of bridge telephone numbers; and
select a bridge telephone number from the plurality of bridge telephone numbers having a closest match.

3. The conference system of claim 2, wherein the processor is configured to determine the closest match based on a longest sequence of matching numbers.

4. The conference system of claim 1, wherein to select the one of the provisioned plurality of bridge telephone numbers, the processor is configured to:
store a defined list of country codes associated with the plurality of bridge telephone numbers;
compare a country code of the target telephone number to the defined list of country codes; and
select a bridge telephone number from the plurality of bridge telephone numbers having a matching country code.

5. The conference system of claim 4, wherein if the country code of the target telephone number does not have a match in the defined list of country codes associated with the plurality of bridge telephone numbers, the processor is configured to:
determine which country code in the defined list of country codes has a nearest associated geographical location to the country code of the target telephone number; and
select the bridge telephone number having the determined country code.

6. The conference system of claim 4, wherein to select the bridge telephone number, the processor is further configured to:
store a defined list of local area codes for each country code associated with the plurality of bridge telephone numbers;
compare a local area code of the target telephone number to the defined list of local area codes for the determined country code; and
select a bridge telephone number from the plurality of bridge telephone numbers having a nearest matching local area code.

7. The conference system of claim 1, wherein to select the bridge telephone number, the processor is configured to:

rank the plurality of bridge telephone numbers based on a ranking factor and the target telephone number; and select a bridge telephone number having a highest rank.

8. The conference system of claim 7, wherein the ranking factor includes a cost ranking factor and a quality ranking factor.

9. The conference system of claim 7, wherein the processor is configured to receive a selection of the ranking factor from a plurality of different ranking factors from an attendee via a user interface.

10. The conference system of claim 1, wherein the processor is configured to:
   determine geographical locations of each of the plurality of attendees;
   match bridge telephone numbers to each of the plurality of attendees based on determined geographical locations; and
   send a conference meeting invites to each of the plurality of attendees, each conference meeting invite including a matched bridge telephone number for that attendee.

11. A method comprising:
   at a processor of a conference system:
      provisioning a plurality of bridge telephone numbers having a plurality of different country codes;
      receiving a dial-out request for one of the plurality of attendees of a conference meeting for connecting to the conference meeting, the dial-out request including a target telephone number associated with a communication device of the one of the plurality of attendees;
      selecting one of the provisioned plurality of bridge telephone numbers based on a result of a match between at least a country code of the selected bridge telephone number and the target telephone number; and
      causing dial-out to the target telephone number from the selected bridge telephone number.

12. The method of claim 11, wherein selecting the one of the provisioned plurality of bridge telephone numbers further comprises:
   performing a regular expression matching between the target telephone number and each of the provisioned plurality of bridge telephone numbers; and
   selecting a bridge telephone number from the plurality of bridge telephone numbers having a closest match.

13. The method of claim 12, wherein the closest match is determined based on a longest sequence of matching numbers.

14. The method of claim 11, wherein selecting the one of the provisioned plurality of bridge telephone numbers further comprises:
   storing a defined list of country codes associated with the plurality of bridge telephone numbers;
   comparing a country code of the target telephone number to the defined list of country codes; and
   selecting a bridge telephone number from the plurality of bridge telephone numbers having a matching country code.

15. The method of claim 14, wherein if the country code of the target telephone number does not have a match in the defined list of country codes associated with the plurality of bridge telephone numbers, the method further comprises:
   determining which country code in the defined list of country codes has a nearest associated geographical location to the country code of the target telephone number; and
   selecting the bridge telephone number having the determined country code.

16. The method of claim 14, wherein selecting the bridge telephone number further comprises:
   storing a defined list of local area codes for each country code associated with the plurality of bridge telephone numbers;
   comparing a local area code of the target telephone number to the defined list of local area codes for the determined country code; and
   selecting a bridge telephone number from the plurality of bridge telephone numbers having a nearest matching local area code.

17. The method of claim 11, wherein selecting the bridge telephone number further comprises:
   ranking the plurality of bridge telephone numbers based on a ranking factor and the target telephone number; and
   selecting a bridge telephone number having a highest rank.

18. The method of claim 17, wherein the ranking factor includes a cost ranking factor and a quality ranking factor.

19. The method of claim 17, further comprising receiving a selection of the ranking factor from a plurality of different ranking factors from an attendee via a user interface.

20. A conference system comprising:
   a processor configured to:
      receive a dial-out request for one of a plurality of attendees of a conference meeting for connecting to the conference meeting, the dial-out request including a target telephone number associated with a communication device of the one of the plurality of attendees;
      select a bridge telephone number based on a result of a regular expression matching between a plurality of bridge telephone numbers and the target telephone number, the selected bridge telephone number having a longest sequence of matching numbers compared to other bridge telephone numbers of the plurality of bridge telephone numbers; and
      cause dial-out to the target telephone number from the selected bridge telephone number.

* * * * *